(12) United States Patent
Lin

(10) Patent No.: US 9,366,889 B2
(45) Date of Patent: Jun. 14, 2016

(54) METHOD FOR WITHDRAWING LIQUID CRYSTAL FROM A LIQUID CRYSTAL PANEL AND METHOD FOR RECYCLING A LIQUID CRYSTAL PANEL

(71) Applicant: LEADWELL OPTICAL CO., LTD., Tainan (TW)

(72) Inventor: Yung-Chun Lin, Tainan (TW)

(73) Assignee: LWO TECHNOLOGY CO., LTD., Tainan (TW)

( * ) Notice: Subject to any disclaimer, the term of this patent is extended or adjusted under 35 U.S.C. 154(b) by 79 days.

(21) Appl. No.: 14/277,369

(22) Filed: May 14, 2014

(65) Prior Publication Data

US 2014/0338170 A1   Nov. 20, 2014

(30) Foreign Application Priority Data

May 15, 2013 (TW) .............................. 102117220 A

(51) Int. Cl.
*G02F 1/13* (2006.01)

(52) U.S. Cl.
CPC ............ *G02F 1/1309* (2013.01); *G02F 1/1303* (2013.01); *G02F 2203/68* (2013.01); *Y10T 29/49821* (2015.01)

(58) Field of Classification Search
CPC .................................................. G02F 1/1309
See application file for complete search history.

(56) References Cited

U.S. PATENT DOCUMENTS

| 5,944,934 | A  | * | 8/1999 | Park | B29C 45/14467 141/8 |
| 2006/0164590 | A1 | * | 7/2006 | Liu | G02F 1/1309 349/190 |
| 2007/0146622 | A1 | * | 6/2007 | Yang | G02F 1/1341 349/187 |
| 2013/0156658 | A1 | * | 6/2013 | Shim | B01L 3/502707 422/504 |

* cited by examiner

*Primary Examiner* — Michael Caley
*Assistant Examiner* — Edmond Lau
(74) *Attorney, Agent, or Firm* — Pillsbury Winthrop Shaw Pittman, LLP

(57) ABSTRACT

A method for withdrawing a liquid crystal from a liquid crystal panel includes the steps of: (a) providing a liquid crystal panel that includes a liquid crystal and two spaced-apart substrates cooperatively defining an accommodating space therebetween to accommodate the liquid crystal, and that is divided into a discard region and a reserve region; (b) forming a through hole that is located in the discard region in one of the substrates; and (c) liquefying the liquid crystal that is accommodated in the accommodating space, followed by withdrawing the liquid crystal from the accommodating space through the through hole. A method for recycling a liquid crystal panel is also disclosed.

9 Claims, 8 Drawing Sheets

METHOD FOR WITHDRAWING LIQUID CRYSTAL FROM A LIQUID CRYSTAL PANEL AND METHOD FOR RECYCLING A LIQUID CRYSTAL PANEL

CROSS-REFERENCE TO RELATED APPLICATION

This application claims priority of Taiwanese Patent Application No. 102117220, filed on May 15, 2013, the entire disclosure of which is hereby incorporated by reference.

BACKGROUND OF THE INVENTION

1. Field of the Invention

This invention relates to a method for withdrawing liquid crystal from a liquid crystal panel and a method for recycling a liquid crystal panel.

2. Description of the Related Art

A liquid crystal panel includes a housing and a liquid crystal accommodated in the housing. When the housing of the liquid crystal panel breaks due to an external force or the liquid crystal in the housing is defective or has poor quality, the whole liquid crystal panel has to be replaced. However, the undamaged housing or liquid crystal with good quality would be undesirably discarded.

Therefore, a method for withdrawing a liquid crystal from a liquid crystal panel is needed to separate the housing and the liquid crystal so that the liquid crystal with good quality or the undamaged housing may be recycled for subsequent use.

Referring to FIGS. 1 and 2, a conventional method for withdrawing a liquid crystal 100 from a liquid crystal panel 11 includes the following steps of:

(1) providing a liquid crystal panel 11 that includes two spaced-apart substrates 113 cooperatively defining an accommodating space therebetween to accommodate the liquid crystal 100, and that is divided into a discard region 112 and a reserve region 111 through an imaginary line II-II;

(2) cutting the liquid crystal panel 11 along the imaginary line II-II, the reserve region 111 having a cutting surface 114 that is formed with a slot 115 exposing the accommodating space; and (3) withdrawing the liquid crystal 100 from the accommodating space through the slot 115.

However, in this conventional method, it is relatively hard to efficiently withdrawn the liquid crystal 100 since the slot 115 is relatively narrow, which makes the withdrawing procedure difficult to conduct.

SUMMARY OF THE INVENTION

Therefore, the object of the present invention is to provide a method for withdrawing a liquid crystal from a liquid crystal panel and a method for recycling a liquid crystal panel that can overcome the aforesaid drawback of the prior art.

According to one aspect of the present invention, there is provided a method for withdrawing a liquid crystal from a liquid crystal panel that includes the following steps of:

(a) providing a liquid crystal panel that includes a liquid crystal and two spaced-apart substrates cooperatively defining an accommodating space therebetween to accommodate the liquid crystal, and that is divided into a discard region and a reserve region;

(b) forming a through hole that is located in the discard region in one of the substrates; and (c) liquefying the liquid crystal that is accommodated in the accommodating space, followed by withdrawing the liquid crystal from the accommodating space through the through hole.

According to another aspect of the present invention, there is provided a method for recycling a liquid crystal panel that includes the following steps of:

(a) providing a liquid crystal panel that includes a liquid crystal and two spaced-apart substrates cooperatively defining an accommodating space therebetween to accommodate the liquid crystal, and that is divided into a discard region and a reserve region;

(b) forming a through hole that is located in the discard region in one of the substrates;

(c) liquefying the liquid crystal that is accommodated in the accommodating space, followed by withdrawing the liquid crystal from the accommodating space through the through hole;

(d) cutting the liquid crystal panel so as to separate the discard region and the reserve region, the reserve region having a cutting surface that is formed with a slot exposing the accommodating space of the reserve region;

(e) filling a liquid crystal into the accommodating space of the reserve region through the slot; and (f) sealing the slot of the cutting surface using a sealant so as to seal the liquid crystal in the accommodating space of the reserve region.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
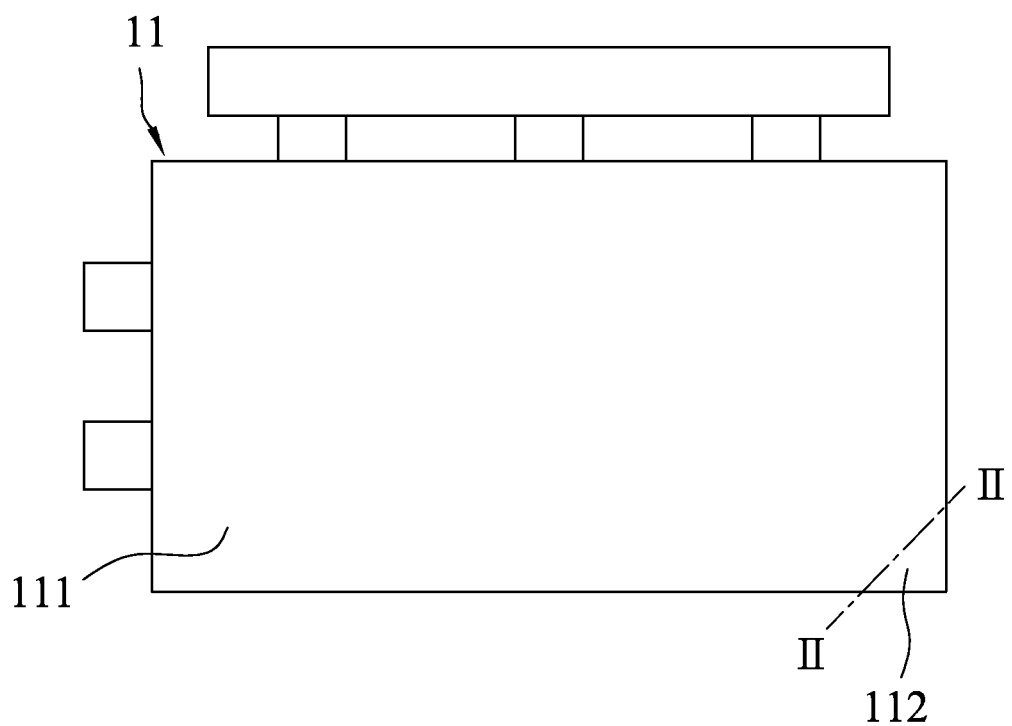
FIG. 1 is a schematic top view of a conventional liquid crystal panel that is cut along an imaginary line II-II for withdrawing a liquid crystal therefrom.
Figure 2:
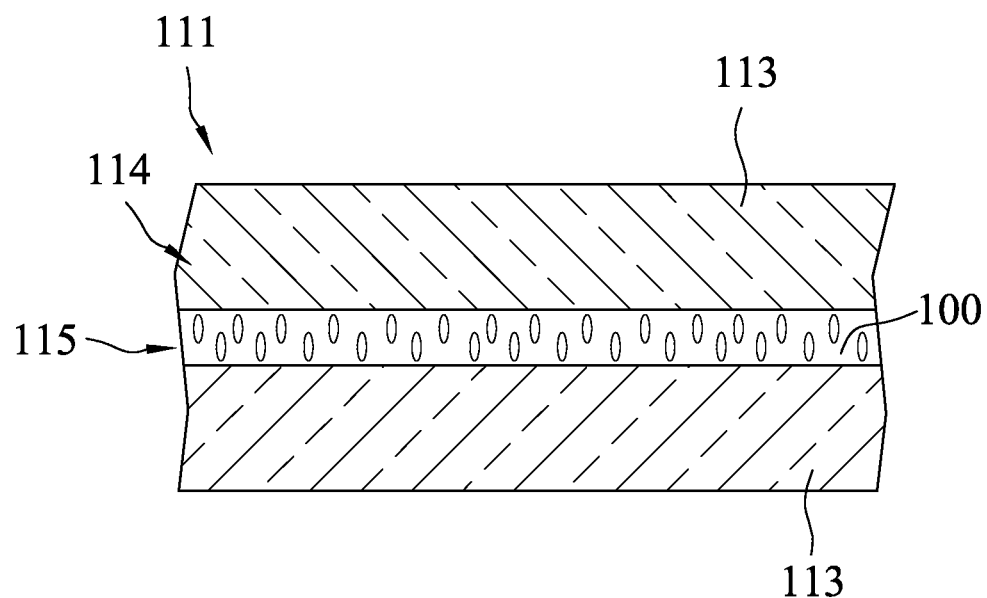
FIG. 2 is a fragmentary sectional view of the conventional liquid crystal panel after being cut along the imaginary line II-II in FIG. 1.

Before the present invention is described in greater detail, it should be noted that like elements are denoted by the same reference numerals throughout the disclosure.

Figure 3:
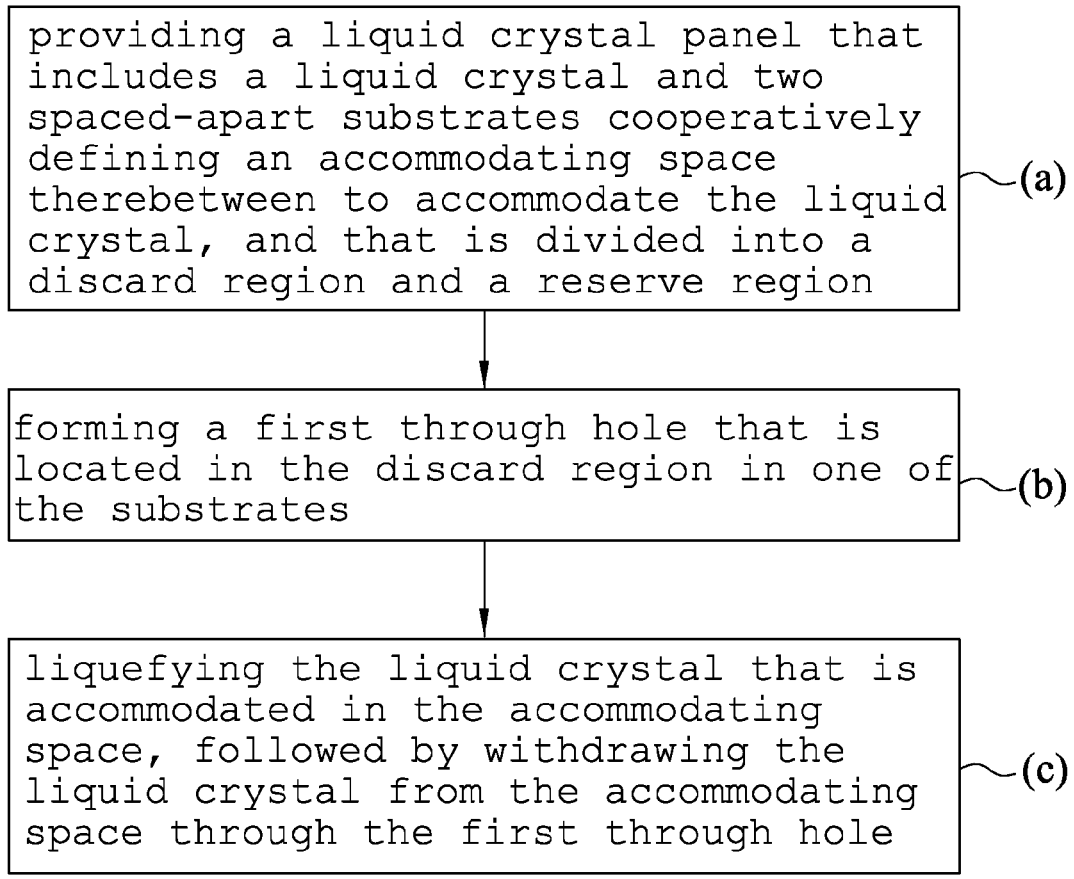
FIG. 3 is a flowchart of the preferred embodiments of a method for withdrawing a liquid crystal from a liquid crystal panel according to this invention.
Figure 4:
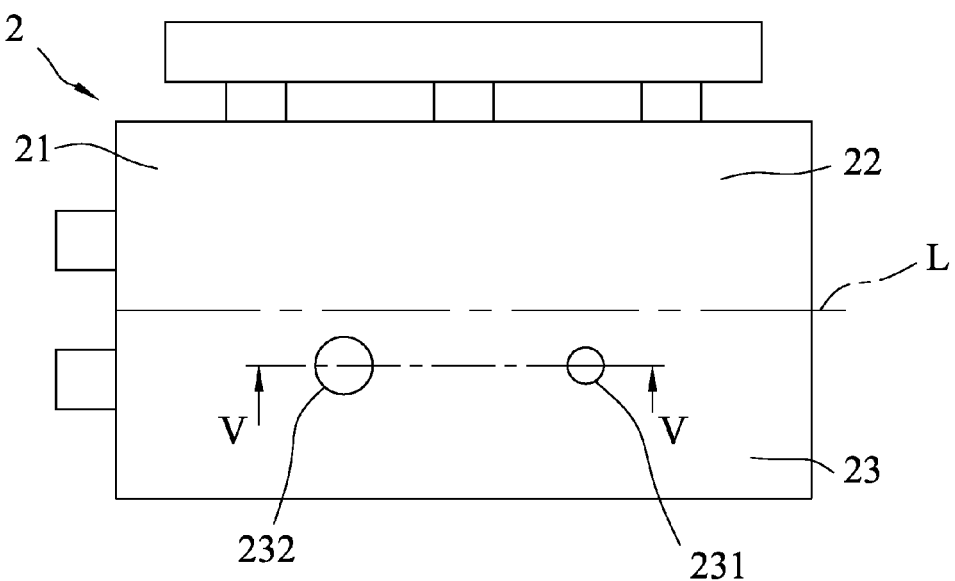
FIG. 4 is a schematic top view of a liquid crystal panel used in the first preferred embodiment of the method.
Figure 5:
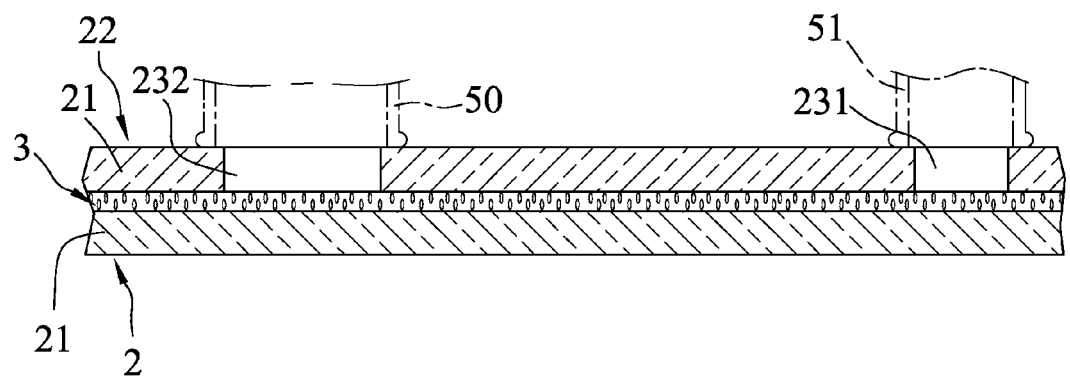
FIG. 5 is a fragmentary sectional view of the liquid crystal panel taken along line V-V in FIG. 4.

Referring to FIGS. 3, 4 and 5, the first preferred embodiment of a method for withdrawing a liquid crystal 3 from a liquid crystal panel 2 according to the present invention includes the following steps:

(a) providing a liquid crystal panel 2 that includes a liquid crystal 3 and two spaced-apart substrates 21 cooperatively defining an accommodating space therebetween to accommodate the liquid crystal 3, and that is divided into a discard region 23 and a reserve region 22 by an imaginary line (L);

(b) forming a first through hole 231 that is located in the discard region 23 in one of the substrates 21, and a second through hole 232 that is located in the discard region 23 in said one of the substrates 21, the first through hole 231 and the second through hole 232 being separate from each other; and (c) liquefying the liquid crystal 3 that is accommodated in the accommodating space, followed by withdrawing the liquid crystal 3 from the accommodating space through the first through hole 231.

In this embodiment, the reserve region 22 and the discard region 23 are located in upper and lower portions of the liquid crystal panel 2. The shapes of the reserve region 22 and the discard region 23 are not limited and may be changed by adjusting the location of the imaginary line (L) to meet actual requirements.

In this embodiment, in step (b), the first and second through holes 231, 232 are formed at positions adjacent to the reserve region 22 (i.e., adjacent to the imaginary line (L)) using a drilling device (not shown) and are both configured as cylindrical shapes. The first through hole 231 has a size smaller than that of the second through hole 232. It should be noted that the shape and the size of the first and second through holes 231, 232 and the method for forming the first and second through holes 231, 232 are not limited and may vary based on actual requirements.

In step (c), liquefying the liquid crystal 3 accommodated in the accommodating space is conducted by heating the liquid crystal panel 2. To be specific, in this embodiment, the liquid crystal panel 2 is heated in a heating chamber that is capable of providing a high temperature environment to heat the liquid crystal 3 in the liquid crystal panel 2 to its melting point so as to liquefy the liquid crystal 3. The heating temperature in the heating chamber may vary based on the type of the liquid crystal 3. In general, since the melting point of the liquid crystal 3 ranges from 80° C. to 90° C., the heating temperature is set to be within this range.

Subsequently, in this embodiment, in step (c), withdrawing the liquid crystal 3 from the accommodating space through the first through hole 231 is conducted by simultaneously applying a negative pressure to the first through hole 231 using a vacuum suction device and a positive pressure to the second through hole 232. By virtue of the pressure difference between the first and second through holes 231, 232, the liquid crystal 3 is pushed toward the first through hole 231 and is gradually withdrawn out of the accommodating space. More specifically, referring to FIG. 5, in this embodiment, the positive and negative pressures are respectively applied through a first pipe 51 intimately connected to the first through hole 231 and a second pipe 50 intimately connected to the second through hole 232. The liquid crystal 3 is gradually withdrawn out of the accommodating space through the first through hole 231 and the first pipe 51. However, the first and second pipes 51, 50 may be dispensed with depending on actual requirements and should not be taken as a limitation of this invention. Moreover, the second through hole 232 may not be supplied with the positive pressure and may be at an atmosphere pressure in other embodiments. Due to the pressure difference (i.e., the negative pressure of the first through hole 231 and the atmosphere pressure of the second through hole 232), the liquid crystal 3 may also be withdrawn out of the accommodating space.

In this embodiment, the second through hole 232 has a size larger than that of the first through hole 231 so that a relatively low positive pressure applied to the second through hole 232 will be enough to push the liquid crystal 3 to facilitate the withdrawing procedure of the liquid crystal 3. In other embodiments, the sizes of the first and second through holes 231, 232 may vary in order to achieve the desired withdrawing rate of the liquid crystal 3.

It should be noted that the step of forming the second through hole 232 in step (b) may be dispensed with depending on actual requirements. The liquid crystal 3 may thus be withdrawn by only applying the negative pressure to the first through hole 231.

Figure 6:
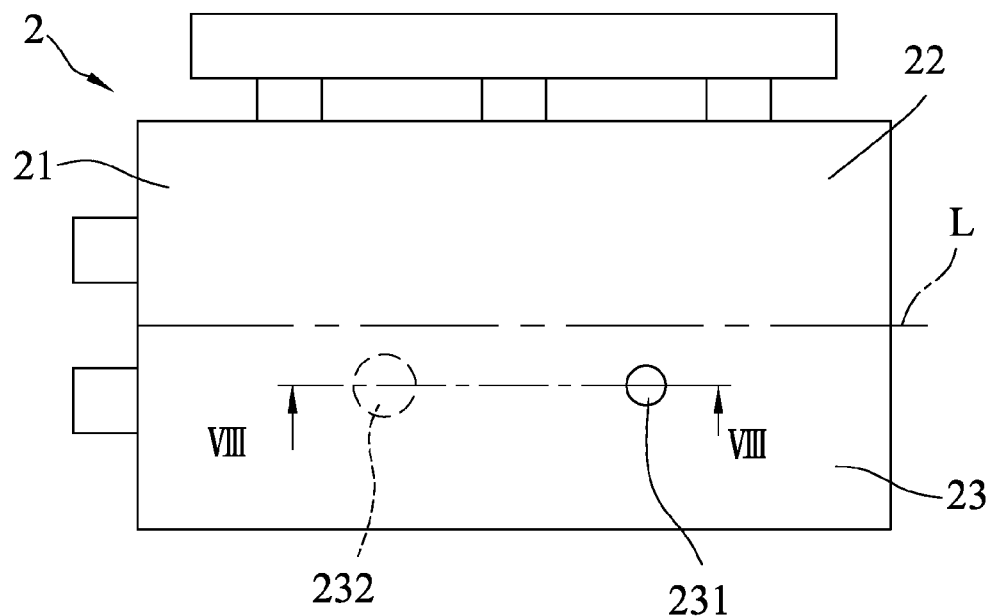
FIG. 6 is a schematic top view of a liquid crystal panel used in the second preferred embodiment of the method.
Figure 7:
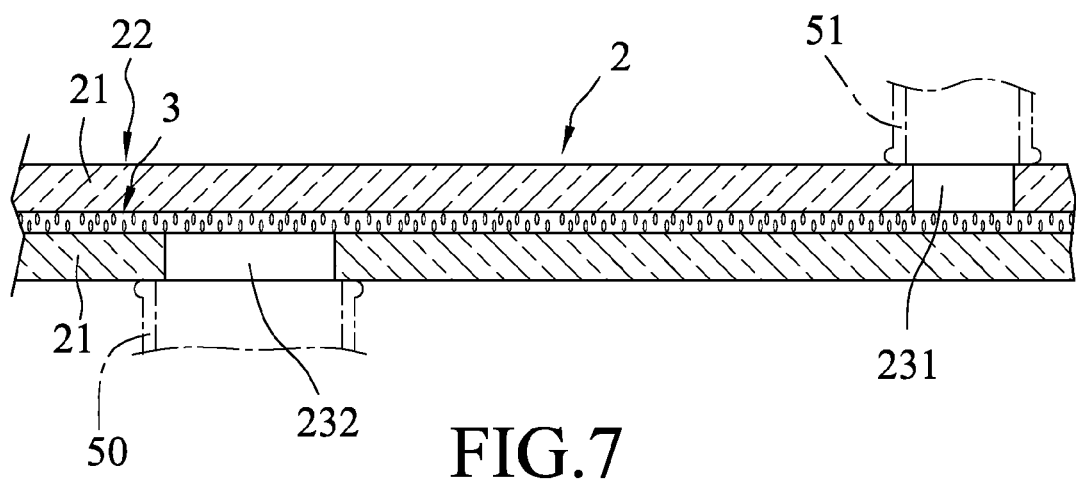
FIG. 7 is a fragmentary sectional view of the liquid crystal panel taken along line VII-VII in FIG. 6.

Referring to FIGS. 6 and 7, the second preferred embodiment of a method for withdrawing a liquid crystal 3 from a liquid crystal panel 2 according to the present invention is similar to the first preferred embodiment, except that, in step (b), the second through hole 232 is formed to be located in the discard region 23 in the other one of the substrates 21, and the first and second through holes 231, 232 are staggered with respect to each other so as to avoid limiting flow of the liquid crystal 3 within a relatively narrow region of the accommodating space.

Figure 8:
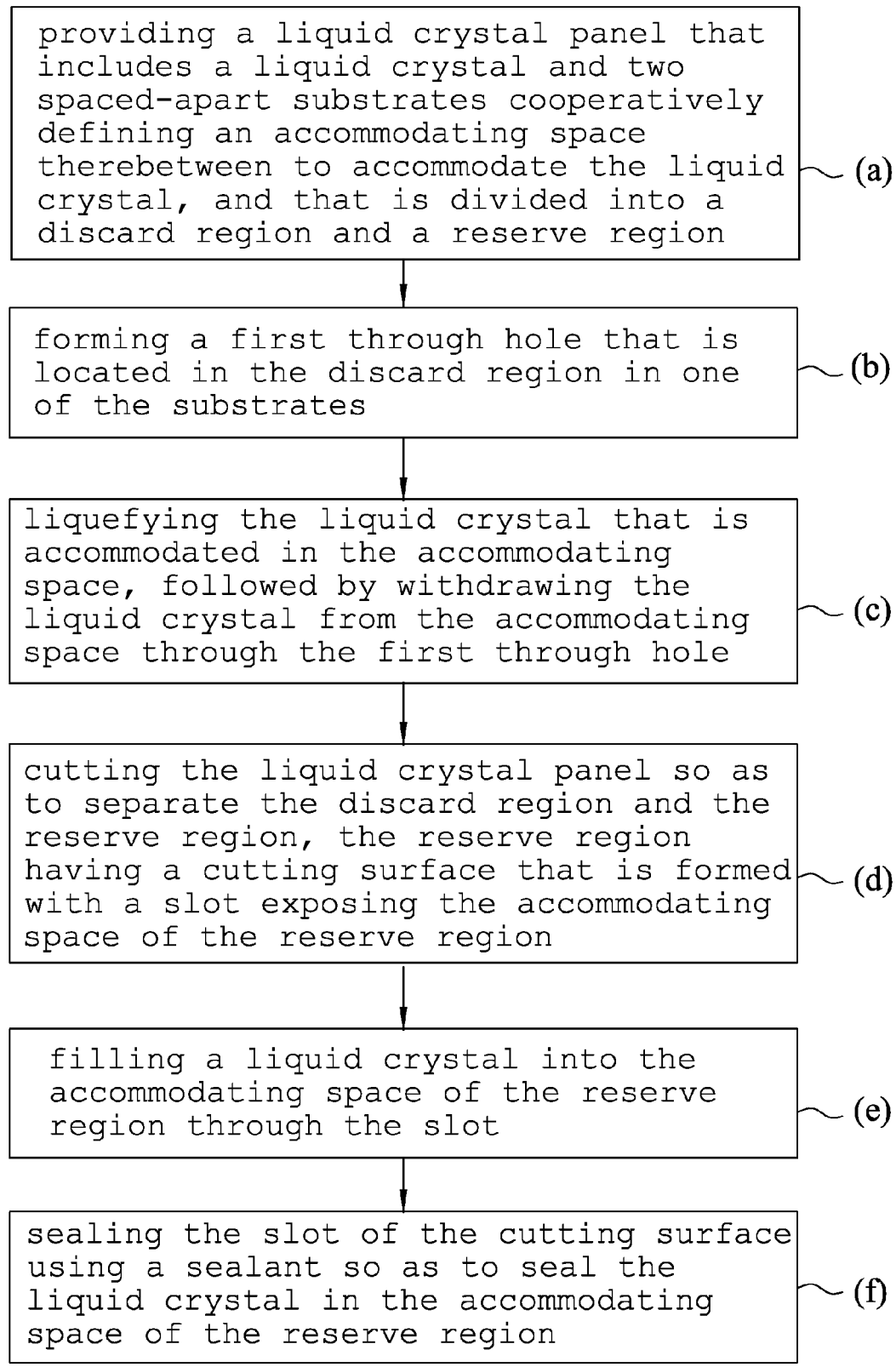
FIG. 8 is a flowchart of the preferred embodiments of a method for recycling a liquid crystal panel according to this invention.
Figure 9:
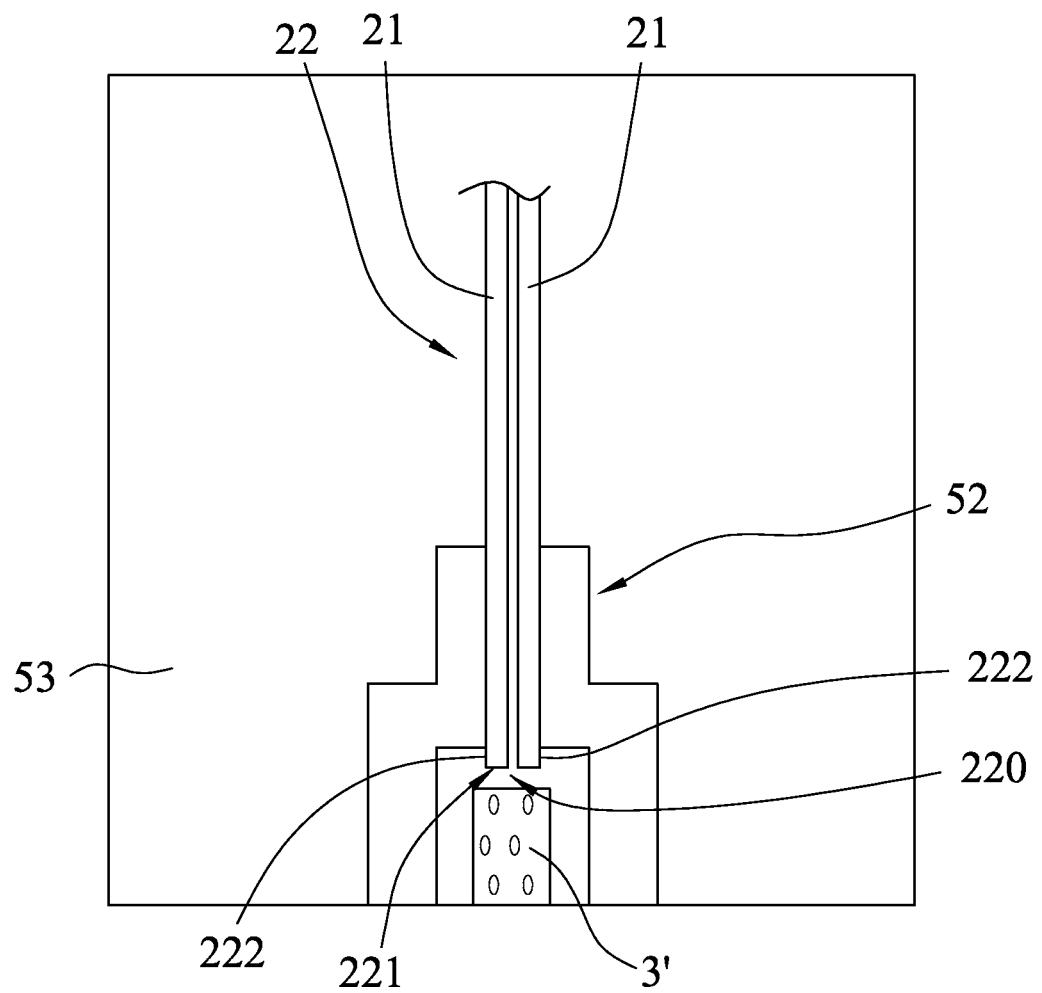
FIG. 9 is a fragmentary schematic view showing a filling step of the method for recycling a liquid crystal panel.
Figure 10:
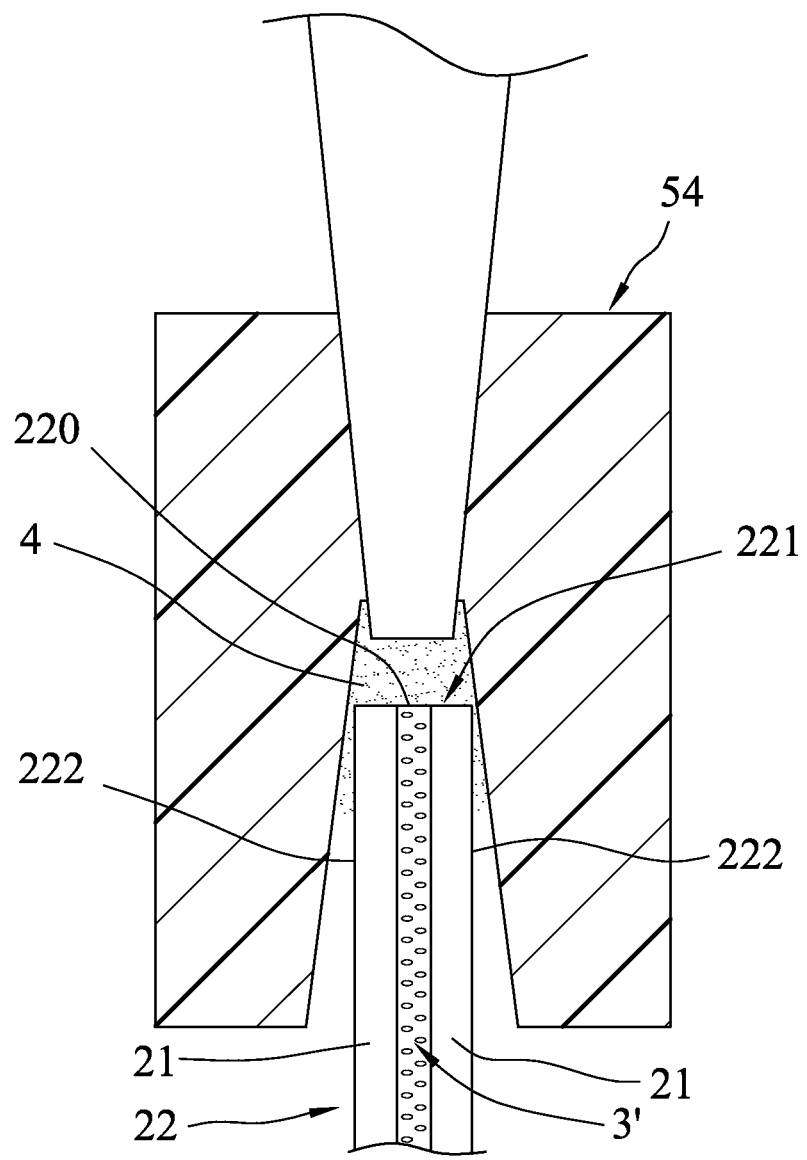
FIG. 10 is a fragmentary schematic view showing a sealing step of the method for recycling a liquid crystal panel.

Referring to FIGS. 8, 9 and 10, the preferred embodiment of a method for recycling a liquid crystal panel 2 according to the present invention includes the following steps:

(a) providing a liquid crystal 3 panel 2 that includes a liquid crystal 3 and two spaced-apart substrates 21 cooperatively defining an accommodating space therebetween to accommodate the liquid crystal 3, and that is divided into a discard region 23 and a reserve region 22;

(b) forming a first through hole 231 that is located in the discard region 23 in one of the substrates 21;

(c) liquefying the liquid crystal 3 that is accommodated in the accommodating space, followed by withdrawing the liquid crystal 3 from the accommodating space through the first through hole 231;

(d) cutting the liquid crystal panel 2 so as to separate the discard region 23 and the reserve region 22, the reserve region 22 having a cutting surface 221 that is formed with a slot 220 exposing the accommodating space of the reserve region 22;

(e) filling a liquid crystal 3' into the accommodating space of the reserve region 22 through the slot 220; and (f) sealing the slot 220 of the cutting surface 221 using a sealant 4 so as to seal the liquid crystal 3' in the accommodating space of the reserve region 22.

It should be noted that steps (a) to (c) in this method are the same as steps (a) to (c) of the method for withdrawing a liquid crystal 3 from a liquid crystal panel 2 according to this invention.

Step (d) is conducted by cutting one of the substrates 21 along the imaginary line (L), followed by cutting the other one of the substrates 21 along the imaginary line (L) so as to break the two substrates 21 to separate the discard region 23 and the reserve region 22.

After cutting, the reserve region 22 also has two lateral surfaces 222 respectively having end portions, and the cutting surface 221 interconnects the end portions of the lateral surfaces 222.

After step (d), the discard region 23 is discarded or is recycled. The reserve region 22 is reserved for subsequent use.

Referring to FIG. 9, in step (e), the reserve region 22 is disposed on a seat 52 in a filling chamber 53. The filling chamber 53 is provided with the liquid crystal 3'. Then, the filling chamber 53 along with the accommodating space of the reserve region 22 are vacuumed, followed by contacting the slot 220 with the liquid crystal 3'. Air is then delivered into the filling chamber 53 such that the liquid crystal 3' is filled into the accommodating space of the reserve region 22 through the slot 220 by capillary phenomenon.

Since the filling procedure of the liquid crystal 3' is well known to a skilled artisan, a detailed description thereof is omitted herein for the sake of brevity.

The type of the liquid crystal 3 withdrawn from the accommodating space in step (c) can be the same as or different from that of the liquid crystal 3' filled into the accommodating space of the reserve region 22 in step (e) depending on actual requirements. Moreover, the liquid crystal 3 withdrawn from the accommodating space in step (c) can be recycled to be refilled into the accommodating space of the reserve region 22 in step (e).

Referring to FIG. 10, in step (f), the sealant 4 is applied to the cutting surface 221 and the end portions of the lateral surfaces 222 using a sealing device 54 so as to seal the slot 220 and to prevent the liquid crystal 3' from flowing out of the accommodating space of the reserve region 22 through the slot 220. Alternatively, the sealant 4 may be applied only to the cutting surface 221 so as to reduce manufacturing costs.

To sum up, with the first through hole 231, the liquid crystal 3 may be easily withdrawn from the accommodating space. Therefore, the withdrawing process is relatively efficient and time saving. Moreover, since the first through hole 231 is formed in the discard region 23 at the position adjacent to the reserve region 22, the liquid crystal 3 in both the discard region 23 and the reserve region 22 may be withdrawn efficiently.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

What is claimed is:

1. A method for recycling a liquid crystal panel, comprising the steps of:
   (a) providing a liquid crystal panel that includes a liquid crystal and two spaced-apart substrates cooperatively defining an accommodating space therebetween to accommodate the liquid crystal, and that is divided into a discard region and a reserve region;
   (b) forming a first through hole that is located in the discard region in one of the substrates;
   (c) liquefying the liquid crystal that is accommodated in the accommodating space, followed by withdrawing the liquid crystal from the accommodating space through the first through hole;
   (d) cutting the liquid crystal panel so as to separate the discard region and the reserve region, the reserve region having a cutting surface that is formed with a slot exposing the accommodating space of the reserve region;
   (e) filling a liquid crystal into the accommodating space of the reserve region through the slot; and
   (f) sealing the slot of the cutting surface using a sealant so as to seal the liquid crystal in the accommodating space of the reserve region.

2. The method as claimed in claim 1, wherein, in step (b), the first through hole is formed at a position adjacent to the reserve region.

3. The method as claimed in claim 1, wherein step (b) further includes forming a second through hole that is located in the discard region in said one of the substrates located, the first through hole and the second through hole being separate from each other.

4. The method as claimed in claim 3, wherein, in step (c), withdrawing the liquid crystal from the accommodating space through the first through hole is conducted by simultaneously applying a negative pressure to the first through hole and a positive pressure to the second through hole.

5. The method as claimed in claim 1, wherein step (b) further includes forming a second through hole that is located in the discard region in the other one of the substrates, the first through hole and the second through hole being staggered with respect to each other.

6. The method as claimed in claim 5, wherein, in step (c), withdrawing the liquid crystal from the accommodating space through the first through hole is conducted by simultaneously applying a negative pressure to the first through hole and a positive pressure to the second through hole.

7. The method as claimed in claim 1, wherein:
   in step (d), the reserve region has two lateral surfaces respectively having end portions, the cutting surface interconnecting the end portions of the lateral surfaces; and
   in step (f), the sealant is applied to the cutting surface and the end portions of the lateral surfaces so as to seal the slot.

8. The method as claimed in claim 1, wherein the type of the liquid crystal withdrawn from the accommodating space in step (c) is the same as that of the liquid crystal filled into the accommodating space of the reserve region in step (e).

9. The method as claimed in claim 1, wherein the type of the liquid crystal withdrawn from the accommodating space in step (c) is different from that of the liquid crystal filled into the accommodating space of the reserve region in step (e).

* * * * *

UNITED STATES PATENT AND TRADEMARK OFFICE
CERTIFICATE OF CORRECTION

| | | |
|---|---|---|
| PATENT NO. | : 9,366,889 B2 | Page 1 of 1 |
| APPLICATION NO. | : 14/277369 | |
| DATED | : June 14, 2016 | |
| INVENTOR(S) | : Kuo | |

It is certified that error appears in the above-identified patent and that said Letters Patent is hereby corrected as shown below:

On the Title Page

Item (72) should read:
(72) Inventors: Yi-Lin Kuo, Tainan City (TW)

Signed and Sealed this
First Day of January, 2019

Andrei Iancu
*Director of the United States Patent and Trademark Office*